3,202,658
THIONOPHOSPHONIC ACID ESTERS AND A
PROCESS FOR THEIR PRODUCTION
Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a German corporation
No Drawing. Filed Feb. 16, 1960, Ser. No. 8,928
Claims priority, application Germany, Feb. 28, 1959,
F 27,831
3 Claims. (Cl. 260—248)

The present invention relates to and has as its objects new and useful thiophosphonic acid esters of general insecticidal or pesticidal activity and processes for their production. The compounds of this invention are thio- or dithiophosphonic acid esters of methyl benzazimides of the following formula

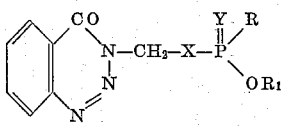

in which R stands for an alkyl or aryl radical, $R_1$ stands for an alkyl radical, X and Y stand for oxygen or sulfur at least one of them being sulfur, and wherein the benzenic radical attached to the azimido ring system may be further substituted.

Similar esters of the above shown type namely such compounds in the phosphoric acid ester series are already known from the literature. U.S. Patent 2,758,115 e.g. discloses thionophosphoric acid esters of N-methyl benzazimide. These compounds are distinguished also by a high insecticidal activity.

It has been found that the highly insecticidal derivatives of N-methyl benzazimide which are object of this invention can be obtained by reacting salts of thiol or thiono-thiolphosphonic acids with N-halomethyl benzazimides.

This reaction is preferably carried out in the presence of inert solvents and at slightly elevated temperatures, similarly to the production of the corresponding phosphoric acid esters.

The new compounds are highly active plant protective agents with insecticidal and acaricidal activity. The toxicity is of the order of the corresponding phosphoric acid esters. The new compounds obtainable according to the invention have the advantage that their thermal stability is greater than that of the corresponding phosphoric acid esters thus enabling the new compounds to be applied even in moist tropical climates.

The new compounds are applied as the corresponding thiophosphoric acid esters, i.e., preferably in combination with suitable liquid or solid extenders or diluents.

As examples for the special utility of the present invention the compounds of the following formulae have been tested against aphids, spider mites and caterpillars:

(I)

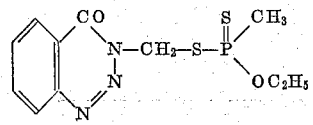

(II)

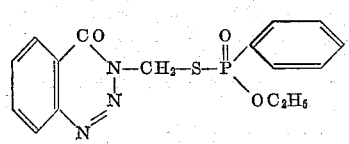

Aqueous dilutions of these compounds have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows:

(a) Against aphids of the type *Doralis fabae:* heavily infested bean plants (*Vicia faba*) have been sprayed drip wet with solutions as prepared above. The effect has been determined after 24 hours by counting the dead pests either on the surface of the soil or still remaining on the plants. The following results have been obtained:

|  | Compound aqueous concentration (in percent active ingredient/water) | Killing rate (in percent) |
|---|---|---|
| (I) | 0.1 | 100 |
| (II) | 0.1 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

|  | Compound aqueous concentration (in percent active ingredient/water) | Killing rate (in percent) |
|---|---|---|
| (I) | 0.01 | 100 |
| (II) | 0.01 | 60 |

(c) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

|  | Compound aqueous concentration (in percent active ingredient/water) | Killing rate (in percent) |
|---|---|---|
| (I) | 0.1 | 100 |
| (II) | 0.1 | 100 |

The following examples are given for the purpose of illustrating the present invention.

*Example 1*

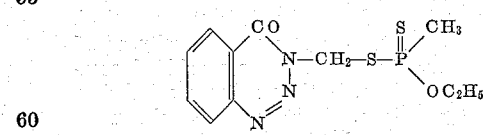

24 grams (0.12 mol) of the potassium salt of methyl-thiono-thiolphosphonic acid ethyl ester and 20 grams (0.1 mol) of N-chloromethyl-benzazimide are heated in 20 cc. of n-propyl alcohol to 70° C. for an hour. The mixture is cooled to room temperature whereupon it is stirred with 50 cc. of water. After a short time the initially precipitated oil solidifies as crystals. The crystals are suction-filtered and recrystallized from 8-times its amount of isopropyl alcohol. 30 grams of the new ester are obtained in this way as colorless crystals of M.P. 104° C. Yield 78.5% of the theoretical. The new ester shows on rats per os a toxicity of 5 mg./kg. LD₅₀. Spider mites are killed completely with 0.01% solutions. Aphids and caterpillars are killed completely with 0.1% solutions. The compounds even have an ovicidal activity against the eggs of red spiders.

By the same way but using instead of the salt of methyl thiono-thiolphosphonic acid ethyl ester the corresponding methyl ester-compound there may be obtained the substance of the following formula

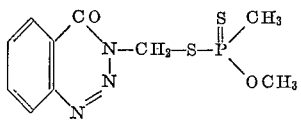

*Example 2*

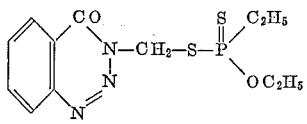

20 grams (0.1 mol) of N-chloromethyl benzazimide and 25 grams (0.12 mol) of the potassium salt of ethyl-thiono-thiolphosphonic acid ethyl ester are heated in 200 cc. of n-propyl alcohol to 70° C. for an hour. After cooling, the reaction product is poured into water, the oil is taken up with benzene, washed with water, dried over sodium sulfate and the solvent distilled off. 30 grams of a yellow highly viscous non-crystallizing oil are obtained. Yield 91% of the theoretical.

The new ester shows on rats per os a toxicity of 5 mg./kg. LD₅₀. Aphids are killed completely with 0.01% solutions. Caterpillars are killed completely with 0.1% solutions. Spider mites are killed to 90% with 0.001% solutions. The new ester shows on the eggs of red spiders an ovicidal activity.

If instead of the potassium salt of ethyl thiono-thiolphosphonic acid ethyl ester there is used the corresponding isopropyl ester-compound there is obtained the substance of the following formula

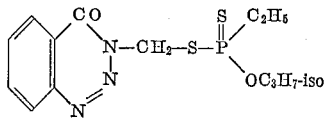

*Example 3*

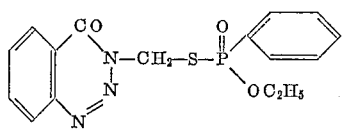

39 grams (0.12 mol) of the ammonium salt of phenyl-thiolphosphonic acid ethyl ester and 20 grams (0.1 mol) of N-chloromethyl-benzazimide are heated to 70° C. for two hours. Work is carried out as described in Example 2 and 32 grams of the ester are obtained in the form of a yellow viscous oil. Yield 92.6 grams of the theoretical.

The new ester shows on rats per os a toxicity of 25 mg./kg. LD₅₀. Aphids and caterpillars are killed completely with 0.1% solutions. Spider mites are killed to 60% with 0.01% solutions. The new ester shows an ovicidal activity on the eggs of red spiders.

*Example 4*

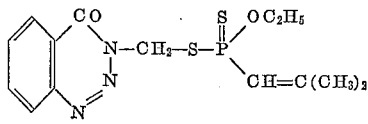

26 grams (0.12 mol) of the ammonium salt of isobutenyl-thiono-thiolphosphonic acid ethyl ester and 20 grams (0.1 mol) of N-chloromethyl-benzazimide are heated in 200 cc. of n-propyl alcohol to 70° C. for an hour. After cooling, 500 cc. of water are added, the oil is taken up in benzene, washed with water, dried over sodium sulfate and the solvent distilled off. 35 grams of the ester are obtained as a yellow highly viscous oil. Yield 99.5% of the theoretical.

The ester shows on rats per os a toxicity of 10 mg./kg. LD₅₀. Aphids and caterpillars are killed completely with 0.1% solutions. Spider mites are killed to 100% with 0.01% solutions.

By the same way but using instead of the ammonium salt of isobutenyl-thiono-thiolphosphonic acid ethyl ester the corresponding equimolecular amount of the ammonium salt of isooctenyl-thiono-thiolphosphonic acid ethyl ester there is obtained the compound of the following formula

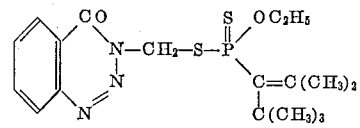

We claim:
1. The compound of the following formula

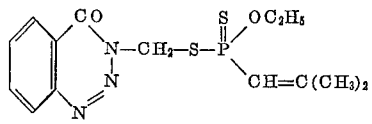

2. The compound of the following formula

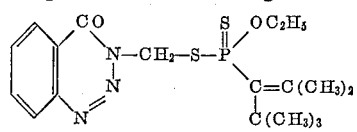

3. A thiophosphonic acid ester of the following formula

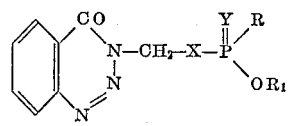

in which R stands for alkenyl having up to 8 carbon atoms, $R_1$ stands for lower alkyl having up to 4 carbon atoms and X and Y each stand for sulfur.

References Cited by the Examiner

UNITED STATES PATENTS

| | | | |
|---|---|---|---|
| 2,758,115 | 8/56 | Lorenz | 260—248 |
| 2,843,588 | 7/58 | Lorenz | 260—248 |
| 2,881,201 | 4/59 | Schrader | 260—461 |
| 2,907,787 | 10/59 | Hoffmann et al. | 260—461 |
| 2,914,530 | 11/59 | Schrader et al. | 260—248 |

FOREIGN PATENTS

| | | |
|---|---|---|
| 167,432 | 1/51 | Austria. |
| 927,270 | 5/55 | Germany. |
| 1,050,768 | 2/59 | Germany. |

OTHER REFERENCES

Kosolapoff: "Organophosphorus Compounds," pub. by John Wiley and Sons, Inc., 1950, page 143.

WALTER A. MODANCE, *Primary Examiner.*

IRVING MARCUS, *Examiner.*